(12) United States Patent
Stam et al.

(10) Patent No.: US 8,079,820 B2
(45) Date of Patent: Dec. 20, 2011

(54) BLADE MODULE, A MODULAR ROTOR BLADE AND A METHOD FOR ASSEMBLING A MODULAR ROTOR BLADE

(75) Inventors: Ronny Stam, Borne (NL); Andreas Starke, Rheine (DE); Bart Veldkamp, Enschede (NL); Jendrik Meyer, Osnabrück (DE)

(73) Assignee: General Electric Company, Schenectady, NY (US)

( * ) Notice: Subject to any disclaimer, the term of this patent is extended or adjusted under 35 U.S.C. 154(b) by 500 days.

(21) Appl. No.: 12/338,023

(22) Filed: Dec. 18, 2008

(65) Prior Publication Data
US 2010/0158694 A1 Jun. 24, 2010

(51) Int. Cl.
*F03B 3/12* (2006.01)
(52) U.S. Cl. ............... 416/230; 416/223 R; 416/229 R; 416/232; 416/241 R; 416/241 A
(58) Field of Classification Search ............ 416/223 R, 416/229 R, 230, 232, 241 R, 241 A
See application file for complete search history.

(56) References Cited

U.S. PATENT DOCUMENTS

| 4,882,201 A | 11/1989 | Crivello et al. |
| 4,920,164 A | 4/1990 | Sasaki et al. |
| 5,015,675 A | 5/1991 | Walles et al. |
| 5,290,883 A | 3/1994 | Hosokawa et al. |
| 6,333,064 B1 | 12/2001 | Gan |
| 6,518,362 B1 | 2/2003 | Clough et al. |
| 6,632,892 B2 | 10/2003 | Rubinsztajn et al. |
| 6,800,373 B2 | 10/2004 | Gorczyca |
| 2003/0138290 A1 | 7/2003 | Wobben |
| 2004/0166241 A1 | 8/2004 | Gallo et al. |

FOREIGN PATENT DOCUMENTS

| WO | WO03/072628 A1 | 9/2003 |
| WO | WO2005/069581 | 7/2005 |
| WO | WO2006/056584 A1 | 6/2006 |
| WO | WO2006/069581 A1 | 7/2006 |

*Primary Examiner* — Michelle Estrada
(74) *Attorney, Agent, or Firm* — Global Patent Operation; Douglas D. Zhang

(57) ABSTRACT

A blade module of a modular rotor blade comprising a hollow fiber composite body which extends along a longitudinal blade axis and at least one inlay located at or near a longitudinal end of the fiber composite body is provided. The inlay includes a receptacle which is adapted to receive a threaded fastener and an anchoring portion anchored to the fiber composite body. Further, a modular wind turbine rotor blade which includes at least two blade modules and a method for assembling a modular wind turbine rotor blade are provided.

19 Claims, 6 Drawing Sheets

500

BLADE MODULE, A MODULAR ROTOR BLADE AND A METHOD FOR ASSEMBLING A MODULAR ROTOR BLADE

BACKGROUND OF THE DISCLOSURE

A blade module of a modular rotor blade and a modular wind turbine rotor blade are disclosed herein. Further, a method for assembling a modular wind turbine rotor blade is disclosed herein.

BRIEF DESCRIPTION OF THE DISCLOSURE

A blade module of a modular rotor blade is provided. According to a first embodiment, the blade module includes a fiber composite body defining a hollow blade profile extending along a longitudinal blade axis and at least one inlay located at or near a longitudinal end of the fiber composite body. The inlay includes a receptacle which is adapted to receive a threaded fastener and an anchoring portion which is anchored to the fiber composite body to transmit tensile forces from the receptacle to the fiber composite body.

Further a modular wind turbine rotor blade which includes at least a first blade module and at least a second blade module is provided. The first blade module includes a first fiber composite body having a first edge and at least a first inlay extending to the first edge. The first inlay includes a first receptacle and an anchoring portion anchored to the first fiber composite body. The second blade module includes a second fiber composite body having a second edge and at least a second inlay extending to the second edge. The second inlay includes a second receptacle and an anchoring portion anchored to the second fiber composite body. According to another embodiment, the modular wind turbine rotor blade further includes a detachable butt joint between the first blade module and the second blade module and a screw joint between the first inlay and the second inlay. The screw joint includes a threaded fastener fastened to the first receptacle and the second receptacle.

Furthermore, a method for assembling a modular wind turbine rotor blade is provided. The method includes providing a first blade module and providing a second blade module. The first blade module includes a first fiber composite body having a first edge and at least one first inlay which extends to or near to the first edge and includes a first receptacle adapted to receive a threaded fastener. The first inlay further includes an anchoring portion anchored to the first fiber composite body. The second blade module includes a second fiber composite body having a second edge and at least one second inlay which extends to near to the second edge and includes a second receptacle adapted to receive a threaded fastener. Further, the second inlay includes an anchoring portion anchored to the second fiber composite body. According to still another embodiment, the method for assembling a modular rotor blade further includes aligning the first blade module and the second blade module such that the first receptacle and the second receptacle are co-axially arranged, and forming a detachable mechanical connection between the first inlay and the second inlay using a threaded fastener that extends into the first receptacle and into the second receptacle.

Further aspects, advantages and features are apparent from the dependent claims, the description and the accompanying drawings.

BRIEF DESCRIPTION OF THE DRAWINGS

A full and enabling disclosure of embodiments, including the best mode thereof, to one of ordinary skill in the art, is set forth more particularly in the remainder of the specification, including reference to the accompanying figures wherein.

For clarity reasons, the same elements or method steps have been designated by the same reference signs in the different drawings and diagrams if not stated otherwise.

DETAILED DESCRIPTION OF THE DISCLOSURE

Reference will now be made in detail to the various embodiments of the disclosure, one or more examples of which are illustrated in the figures. Each example is provided by way of explanation of the disclosure, and is not meant as a limitation. For example, features illustrated or described as part of one embodiment can be used on or in conjunction with other embodiments to yield yet a further embodiment. It is intended that such modifications and variations are included herewith.

Figure 1:
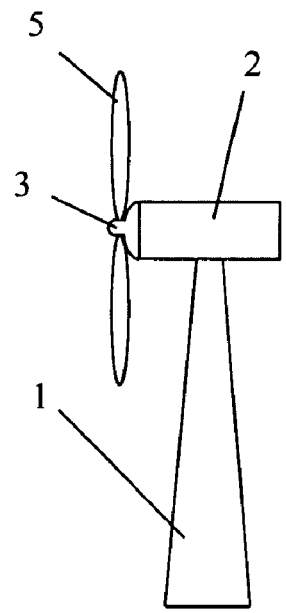
FIG. 1 shows a schematic side view of a wind turbine in which several embodiments are applicable.

FIG. 1 shows a schematic side view of a typical horizontal-axis wind turbine 500. The wind turbine 500 includes a tower 1 to which a machine nacelle 2 is mounted at its top end. A hub or rotor 3 bearing one or more rotor blades 5 is mounted to a lateral end of the machine nacelle 2. Typically, the rotor blades 5 can be adjusted by pitch drives (not shown) accommodated inside the hub 3. In the context of this application, the term "wind turbine" or "wind power installation" refers to a machine that converts the kinetic energy of wind into mechanical energy. The mechanical energy is typically further converted into electrical energy using an asynchronous main generator or a synchronous main generator. The main generator typically delivers electrical power which can be fed into a utility grid up to a rated generator output power. The length of the rotor blades 5 increases in line with the rated generator output power. For wind turbines with a rated generator output power in the MW range, rotor blades with lengths of up to 60 meters or even more are used. Such rotor blades are difficult to produce and transport on account of their length and weight. It is, therefore, often desirable that the rotor blades can be produced and transported in parts or modules to the location at which the wind turbine is erected. Further, large rotor blades are subjected to great dynamic stresses during operation of the wind turbine. Therefore, it is typically also desirable that the assembled rotor blade is capable of being maintained and repaired.

Figure 2:
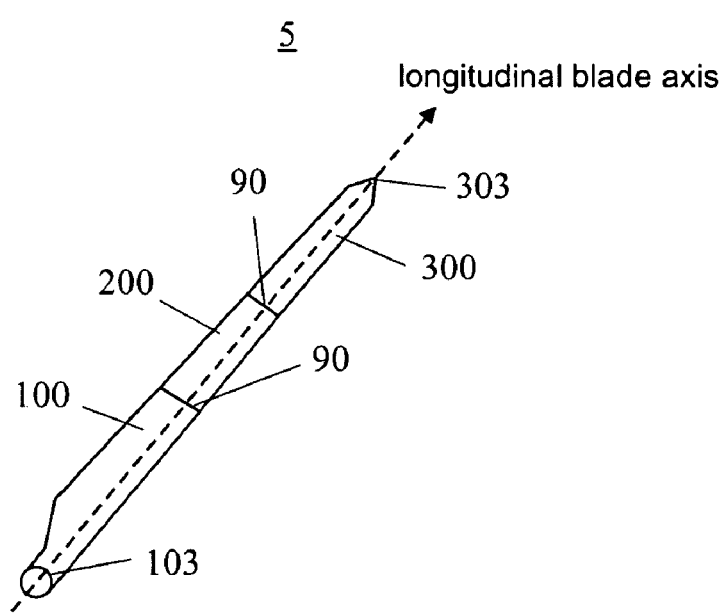
FIG. 2 shows a modular rotor blade of a wind turbine according to an embodiment.

FIG. 2 illustrates in a schematic view a modular rotor blade 5 for use in the wind turbine 500. The assembled modular rotor blade 5 is shaped as a hollow aerodynamic profile body which extends in a longitudinal direction from a rotor blade root or flange 103 to a rotor blade tip 303 defining a longitudinal blade axis. The rotor blade root 103 is typically mounted to the wind turbine hub 3. In the embodiment shown in FIG. 2, the modular rotor blade 5 includes three blade modules, a tip blade module 100, an intermediate blade module 200 and a root blade module 300. Typically, the blade modules 100, 200 and 300 are transversally divided parts or sections of the rotor blade 5. Within this specification a transversal direction should be understood as being essentially orthogonal to the longitudinal direction or longitudinal blade axis. In other examples, the modular rotor blade 5 includes only two blade modules, e.g. a tip blade module and a root blade module, or more than three blade modules, e.g. a root blade module, several intermediate blade modules and a tip blade module mounted one by one along the longitudinal blade axis. Between the root blade module 300 and the intermediate blade module 200 as well as between the intermediate blade module 200 and tip blade module a detachable butt-joined 90 is formed which is explained in more detail below.

Figure 3:
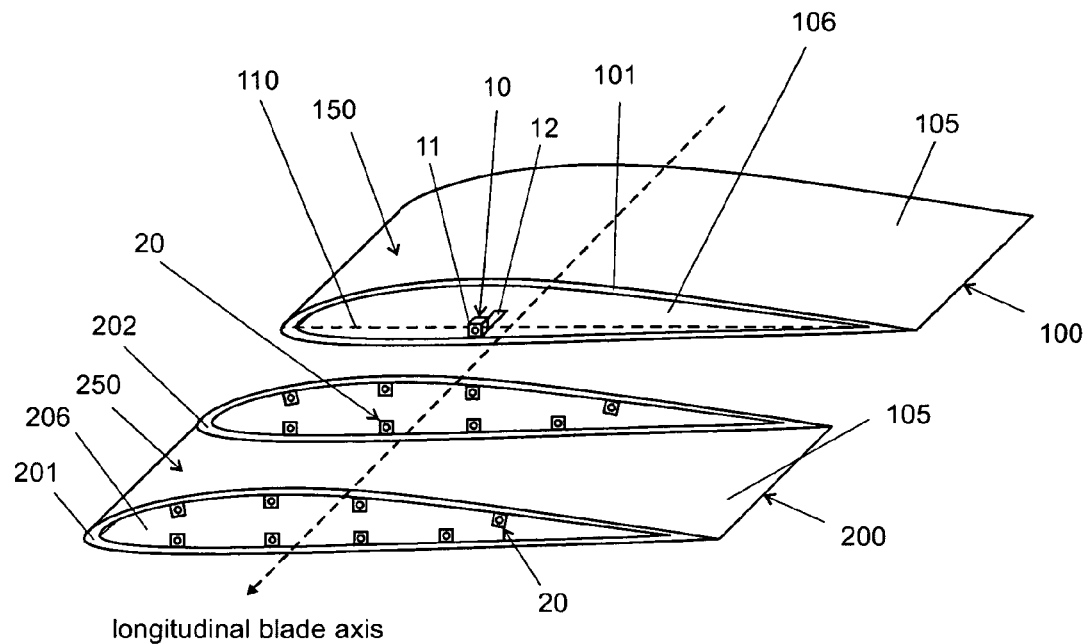
FIG. 3 illustrates two of the rotor blade modules shown FIG. 2 in more detail according to certain embodiments.

FIG. 3 is an exploded view of two assembled blade modules 100 and 200. Both modules 100 and 200 include a respective fiber composite body 150 and 250. The fiber composite bodies 150 and 250 define a hollow blade profile extending along the longitudinal blade axis.

Further, each of the two blade modules 100 and 200 include respective inlays 10 and 20 located at longitudinal ends of the fiber composite body 150 and 250, respectively. In another embodiment, the inlays 10 and 20 are located near to, for example one or a few centimeters away from, the longitudinal ends of the respective fiber composite body 150 and 250. The inlays 10 and 20 are adapted to receive a threaded fastener for forming a detachable butt-joined between the blade module 100 and the blade module 200. To this end, the inlays 10 and 20 are typically arranged face-to-face and co-axially and screwed together in pairs. If the blade modules 100 and 200 are intermediate blade modules as show in FIG. 3, they typically include several inlays on both longitudinal ends of the respective fiber composite body. For sake of simplicity, only one of the eight inlays 10 arranged at the longitudinal end in blade tip direction of the fiber composite body 150 is shown in the drawing of FIG. 3. A root blade module typically includes inlays only at the longitudinal tip end of the fiber composite body. Likewise, a tip blade module typically includes inlays only at the longitudinal root end of the fiber composite body. Further, the number of inlays of a root blade module is typically higher than the number of inlays of a tip blade module for a modular rotor blade which is made of more than two blade modules. This is because the mechanical load of a detachable butt-joined 90 between a root blade module and an intermediate blade module is typically higher than between a tip blade module and an intermediate blade module. In other words, fewer screw joints may be used to reversibly fasten blade modules to each other that are closer to the blade tip.

As the typical set-up of both blade modules 100 and 200 is similar, it is only explained with reference to the blade module 100 only. In some embodiments, the inlays 10 and 20 are even identical. The inlays 10 includes a receptacle or receptacle portion 11 which is adapted to receive a threaded fastener and an anchoring portion 12 which is anchored to the fiber composite body 150 to transmit tensile forces from the receptacle 11 to the fiber composite body 150. Typically, the anchoring portion 12 is glued or laminated or molded to the fiber composite body 100 to ensure a stable connection. The fiber composite body 100 is typically made of a fiber composite material or a fiber-reinforced composite such as reinforced glass, carbon, synthetic fibers or a combination thereof Typically, the receptacle 11 is arranged on an inner surface 106 of the fiber composite body 150 as shown in FIG. 3. In another embodiment, the receptacle 11 is at least partially arranged between an outer surface 105 and the inner surface 106 of the fiber composite body 150. For aerodynamic reasons, the receptacle 11 typically extends not trough the outer surface 105. Further, the receptacle 11 may be completely arranged between the outer surface 105 and the inner surface 106.

In one embodiment, the blade modules 100 and 200 are produced in a mold by laminating of fiber mats and the respective inlays 10 and 20. The fiber mat can e.g. be formed as chopped strand mat (CSM). It should be further understood, that the term "fiber mat" can also refer to a stack of at least two fiber mats. Exemplary fibers that may be used in fiber mats comprise carbon fibers (e.g. TORAYCA® T800, TORAYCA® T700, and TORAYCA® T600 from Toray Industries, Inc.; MAGNAMITE® IM7 and MAGNAMITE® AS4 from Hexcel Corporation; and BESFIGHT® STS and BESFIGHT® HTS from Toho Tenax, Inc.), glass fibers (e.g. quartz, E-glass, S-2 glass, Rglass from suppliers such as PPG, AGY, St. Gobain, Owens-Corning, or Johns Manville), polyester fibers, polyamide fibers (such as NYLON™ polyamide available from E.I. DuPont, Wilmington, Del., USA), aromatic polyamide fibers (such as KEVLAR™ aromatic polyamide available from E.I. DuPont, Wilmington, Del., USA; or P84™ aromatic polyamide available from Lenzing Aktiengesellschaft, Austria), polyimide fibers (such as KAPTON™ polyimide available from E.I. DuPont, Wilmington, Del., USA), extended chain polyethylene (such as SPECTRA™ polyethylene from Honeywell International Inc., Morristown, N.J., USA; or DYNEEMA™ polyethylene from Toyobo Co., Ltd., or DSM, boron fibers, and the like. The strength of the fibers may be further increased by using techniques known in the art, such as, but not limited to, forming a plurality of layers or plies, by orientation of the fibers in a direction, and like methods. The fibers may be made available in any conventional form such as, braided, unidirectional, woven fabric, knitted fabric, swirl fabric, felt mat, wound, and the like. It should be further understood, that the fiber mats may be pre-impregnated with a resin. Usually, the fiber-reinforced composite is formed by impregnation of fiber mats with and curing of resin or plastic. Typically, the resin comprises at least one curable monomer. The monomers may have at least one isocyanate unit, ester unit, ethylenic unit, cyclic ether unit, or epoxide unit, oxetane unit, or the like, or combinations thereof. Suitable curable monomers comprise unsaturated polyester such as POLYLITE® polyester resin available from Reichhold, SYNOLITE® polyester resin available from DSM, AROPOL™ polyester resin available from Ashland; vinyl esters such as DION®, NORPOL®, and HYDREX® resins available from Reichhold, DERAKANE®, DERAKANE MOMENTUM® and HETRON® resins available from Ashland, ATLAC E-NOVA® resin available from DSM; acrylates, diacrylates, dimethacrylates, multi-functional acrylates and multifunctional methacrylates such as polyester acrylates, epoxy acrylates and urethane acrylates, and the like, available from such companies as Cytec Surface Specialties, Sartomer, Rahn, and BASF. The curable monomer is typically present in a range of from about 90% by weight to about 10% by weight, based on the total weight of the fiber composite, and more preferably, in a range of from about 80% by weight to about 20% weight, based on the total weight of the fiber composite.

Suitable resins comprising at least one cyclic ether unit comprise aliphatic epoxy resins, cycloaliphatic epoxy resins such as ERL-4221, CYRACURE™ UVR-6110, CYRACURE™ UVR-6107, and CYRACURE™ UVR-6105 from Dow Chemical Company and UVACURE® 1500 from Cytec Surface Specialties; bisphenol-A epoxy resins, bisphenol-F epoxy resins, phenol novolac epoxy resins, cresol-novolac epoxy resins, biphenyl epoxy resins, multi-functional epoxy resins (i.e. epoxy resins comprising two or more epoxy groups), naphthalene epoxy resins (e.g., EPICLON® EXA-4700 from Dainippon Ink and Chemicals), divinylbenzene dioxide, 2-glycidylphenylglycidyl ether, dicyclopentadiene-type epoxy resins (e.g., EPICLON® HP-7200 from Dainippon Ink and Chemicals), multi-aromatic resin type epoxy resins, or the like, or combinations thereof. All of these classes of epoxy resins are known in the art and are widely available and preparable by known methods. Other illustrative examples of particular suitable epoxy resins and curing processes are described, for example, in U.S. Pat. Nos. 4,882,201, 4,920,164, 5,015,675, 5,290,883, 6,333,064, 6,518,362, 6,632,892, 6,800,373; U.S. Patent Application Publication No. 2004/0166241, and WO 03/072628 A1. Multi-functional oxetane resins may also be applied.

Any of those resins should be selected with respect to a particular fiber reinforcement for producing a fiber-reinforced composite part of the wind turbine 80 with the desired mechanical and environmental properties. The resin is usually degassed under vacuum after mixing of a hardener/catalyst in the resin, to eliminate or remove all entrapped air from the liquid resin. The resin should typically be capable of proceeding through a vacuum pressure cycle environment of heat and time without formation of gas bubbles or voids.

Fillers which may further be present in fiber composites may comprise organic or inorganic fillers, reinforcing fillers, extending fillers, nanoparticles, or the like, or mixtures thereof. In particular embodiments, the filler generally comprises a reinforcing filler, such as, but not limited to, a fiber having high strength. The fillers may be UV transparent fillers such as, but not limited to, glass, silica, fumed silica, alumina, zirconium oxide, nanoparticles, and the like. Alternately, the fillers may be UV opaque fillers such as, but not limited to, carbon fibers, carbon black, silicon carbide, boron nitride, zirconium oxide, titanium dioxide, chalk, calcium sulfate, barium sulfate, calcium carbonate, silicates such as talc, mica or kaolin, silicas, aluminum hydroxide, magnesium hydroxide, or organic fillers such as polymer powders, polymer fibers, or the like. In the present context UV opaque means that the material either blocks UV radiation, or absorbs UV radiation, or both. Those skilled in the art will recognize that, depending upon such factors as physical form or method of synthesis, certain fillers may be either UV opaque or UV transparent. Mixtures of more than one filler may also be used. The filler may be present in the composition in a range of from about 1% to about 90%, and more typically in a range of from about 10% to about 80% by weight, based on the total weight of the fiber composite. More preferably, the filler maybe present in a range of from about 30% to about 75% by weight, based on the total weight of the fiber composite.

Further, a rotor blade module may be fabricated from two longitudinally divided, e.g. divided along the cord-line 110, half blade modules. Typically, the half blade modules are produced by laminating in a mold. The half blade modules may already be fastened together by the manufacturer or during erection of the wind turbine. In particular for mounting the half-modules during erecting the wind turbine, the two half blade modules may include further inlays which are located at or near to transversal ends of the fiber-composite body. The two half blade modules may be fastened together using co-axially orientated inlays as explained herein for mounting two blade modules. In other words, the mounting principle explained herein is applicable to longitudinally divided hollow profile members of rotor blades as well as transversely divided hollow profile members of rotor blades, with the inserts being arranged at the periphery of the hollow profile member.

Compared to rotor blades in one piece, in particular large rotor blades in one piece, the production and/or the transportation of the rotor blade modules to the erection side of the wind turbine are often less complex and less expensive. Further, even the erection of large rotor blades may represent a serious obstacle that can be avoided by successively mounting the rotor blades modules to the already mounted rotor of the wind turbine. Further, in the event of a damage or erosion of a part of the modular rotor blade, only the affected modules may be replaced. Furthermore, during field experiments to optimize the aerodynamic properties of the rotor blades, differently shaped modules, e.g. different tip modules, can easily be exchanged.

Typically, the fiber composite bodies 150 and 250 are transversal sections of the modular rotor blade 5 as shown in FIG. 3. The inlays 10 extend typically to a first edge or first lateral surface 101 which is transversally arranged between the inner surface 106 and the outer surface 105 of the blade module 100 at the end of the module 100 that is orientated towards the blade tip. Likewise, the inlays 20 extend to a second edge or second lateral surface 202 which is transversally arranged between an inner surface 206 and an outer surface 205 of the blade module 200 at the end of the module 200 that is orientated towards the blade root. The inlay 10 and 20 may, however, also be spaced apart, e.g. one or two centimeters, from the respective edge. For stability reasons, the receptacles of the inlays 10 and 20, respectively, extend typically to or at least close to the respective edge 101 and 202.

According to another embodiment, the receptacles of the first inlays 10 and the receptacles of the second inlays 20 are at least pair wise co-axially orientated to each other and screwed together using only one one-piece threaded fastener per receptacle pair. In doing so, a simple, stable and detachable butt-joined between the two blade modules 100 and 200 can be formed.

According to yet another embodiment, the blade module 200 includes further inlays 20 extending to a first edge 201 which is arranged in a transversal plane between the inner surface 206 and the outer surface 205 of the blade module 200 at the end of the module 200 that is orientated towards the blade tip. Such a blade module 200 can be used as intermediate blade module.

Figure 4:
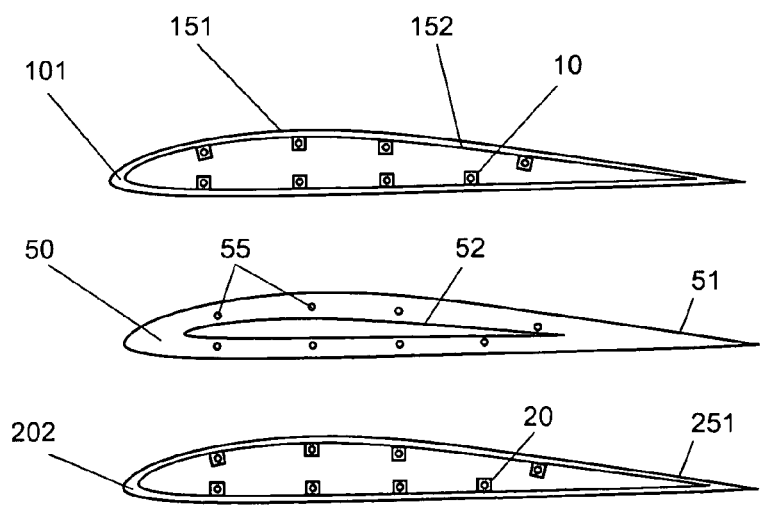
FIG. 4 shows a side view of the rotor blade modules of FIG. 3 and an intermediate piece according to another embodiment.

In FIG. 4 a section of the blade module 100 of FIG. 3 in the plane of the first edge 101 and a section of the blade module 200 of FIG. 3 in the plane of the second edge 202 are shown. In an embodiment, the detachable butt-joined is formed directly between the first edge 101 of the blade module 100 and the second edge 202 of the blade module 200. In another embodiment, an intermediate piece 50 is fastened to the respective edge at least to one of the blade module 100 and the blade module 200. The intermediate piece 50 includes a hole 55 for each of the face-to-face mounted pairs of inlays 10 and 20 such that each pair of inlays 10 and 20 can be fastened by on threaded fastener. Typically the intermediate piece 50 is fastened to the respective edge by a glued joint and/or a screw joint. Further, the intermediate piece 50 is typically essentially flat, i.e. its extension in the longitudinal direction is small compared to the extensions in transversal directions. For aerodynamic reasons, the outer profile 51 of the intermediate piece 50 is made such that a smooth intersection between the two blade modules 100 and 200 is achieved. Furthermore, the intermediate piece 50 is typically made of a metal such as aluminum or steel. This applies typically also to the inlays 10 and 20 and ensures a stable connection between the blade modules 100 and 200.

Figure 5:
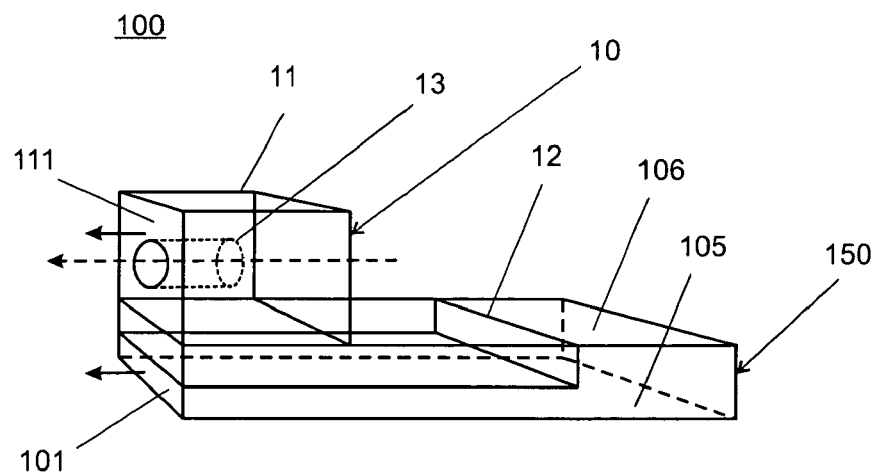
FIG. 5 shows a section of a rotor blade module according to still another embodiment.

FIG. 5 shows a schematic section of a rotor blade module 100 close to an inlay 10. The blade module 100 includes a fiber composite body 150 bounded by an outer surface 105, an inner surface 106 and a first lateral surface or first edge 101. The first lateral surface 101 is essentially perpendicularly adjoining the outer surface 105 and the inner surface 106. According to a further embodiment, the inlay 10 includes an essentially cuboidal receptacle or receptacle portion 11 which is arranged on the inner surface 106 and an anchoring portion 12 to transmit tensile forces from the receptacle 11 to the fiber composite body 150. To this end, the anchoring portion is typically laminated into the fiber composite body 150. Typically, the longitudinal extension of anchoring portion 12 is larger than the longitudinal extension of the receptacle 11 to ensure a tight connection between the inlay 10 and the fiber composite body 150. The inlay 10 may e.g. be L-shaped with the anchoring portion being plate-shaped as shown in FIG. 5. In another example, the anchoring portion is formed as a dove-tail which further increases the ability to transmit tensile forces from the receptacle 11 to the fiber composite body 150. A strong anchorage of the anchoring portion 12 and the fiber composite body 150 can also be achieved if the anchoring portion 12 is made of a fiber composite material, in particular of the same fiber composite material as the fiber composite body 150. On the other hand, the receptacle 11 is typically made of a metal such as steel. This is because the receptacle 11 is typically adapted to receive a metallic threaded fastener. In certain embodiments, the receptacle 11 and the anchoring portion 12 are made from the same metal to ensure a high mechanical stability of the inlay 10 itself.

Typically, the receptacle 11 has a first surface 111 which is essentially parallel orientated to and adjoins the first lateral surface 101. Further, the receptacle 11 includes a cylindrical bushing 13 extending from the first surface 111 at least into the receptacle 11 in a direction which is parallel to the normal direction of the first lateral surface 101 and/or parallel to the longitudinal blade axis. In the shown example of FIG. 5, the cylindrical bushing 13 has an inside thread (not shown) for screwing a threaded rod into the cylindrical bushing 13.

In another embodiment, the bushing 13 of the receptacle 11 is completely arranged between the outer surface 105 and the inner surface 106.

Figure 6:
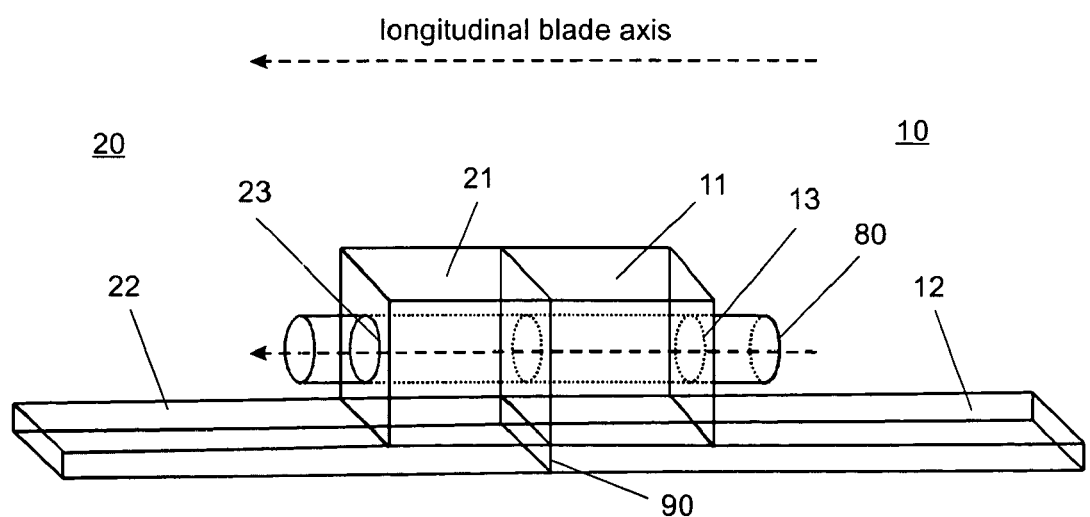
FIG. 6 illustrates the arrangement of two inlays between two rotor blade modules according to yet another embodiment.

FIG. 6 illustrates the arrangement of two inlays 10 and 20 for forming a detachable butt-joined 90 between two blade modules. For sake of simplicity, the respective fiber composite bodies of the two blade modules are not shown.

According to a further embodiment, the co-axial and face-to-face arranged first and second receptacle 10 and 20 are identical. In addition, the anchoring portion 12 and the anchoring portion 22 maybe identical as shown in FIG. 6. The bushing 13 and 23 extends throughout the respective receptacles in a direction which is typically parallel to the longitudinal blade axis. In doing so, a one-piece threaded fastener 80, which is also orientated parallel to the longitudinal blade axis, can be used to screw the two receptacles 10 and 20 together. In other words, the receptacles 11 and 21 form flange portions of the inlays 10 and 20, respectively, and are adapted to receive a threaded fastener 80 which is orientated essentially parallel to the longitudinal blade axis. The threaded fastener 80 may e.g. be a threaded rod that is fastened with at least one nut on each end of the rod or a headed screw that is screwed into a nut.

Figure 7:
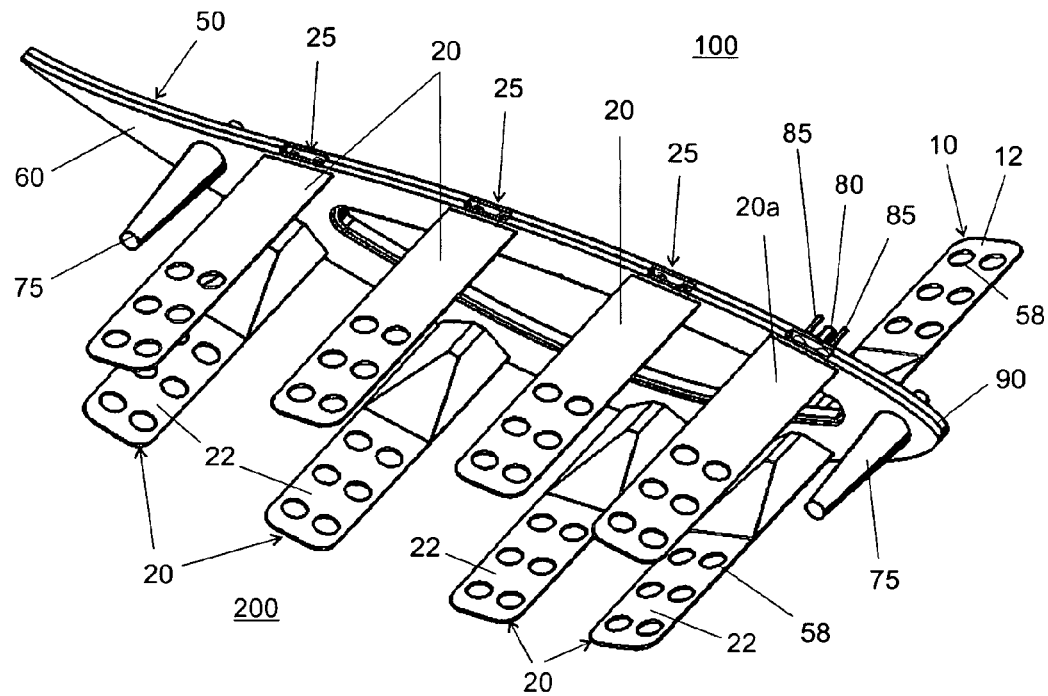
FIG. 7 shows a detailed schematic drawing of a butt-joined between two rotor blade modules according to certain embodiments.

FIG. 7 illustrates a detachable but-joined 90 between two rotor blade modules 100 and 200. Each rotor blade module is a transversally divided hollow profile member of a modular rotor blade and includes eight inlays which are screwed together in pairs using a threaded rod 80 for each pair. The anchoring portions 12 and 22 of the inlays 10 and 20 include holes 58 as surface-enlarging structures to increase the bond between the inlays 10 and 20 and the respective fiber composite body. Alternatively and/or in addition rips orientated in a longitudinal direction or in direction of the cord-line 110 arranged on, and/or a roughened surface of the anchoring portions 12 and 22 may be used. For sake of clarity, the fiber composite bodies of the rotor blade modules 100 and 200 are not shown. Further, only one of the eight inlays 10 of the rotor blade 100 and only one threaded rod 80 is drawn.

To each of the fiber composite bodies a flat metal intermediate piece 50 and 60, respectively is fastened by screws 85. Typically, the intermediate piece 50 and 60 are screwed to the respective inlays 10 and 20. Alternatively and/or additionally the intermediate piece 50 and 60 are screwed and/or glued to the respective fiber composite body. Again, only two of the 16 screws used to mount the intermediate piece 50 to the fiber composite body of the rotor blade module 100 are shown for sake of clarity. According to another embodiment, the intermediate piece 50 of the rotor blade module 100 includes two conical metal pre-centering pins 75 which fit through holes in the intermediate piece 60 and into conical recesses of the fiber composite body of the rotor blade module 200. The pre-centering pins 75 simplify the alignment of the two rotor blade modules to each other during assembling the modular rotor blade.

According to yet another embodiment, the intermediate piece 50 and 60 include recesses or depressions around the holes (not shown) for the threaded rods 80 that form slots 25 between the assembled rotor blade modules 100 and 200 in regions between each of the face-to-face mounted receptacles pairs of the first and second inlays 10 and 20. As the slots 25 are accessible from outside of the modular rotor blade a tightening tool can easily be inserted into the slot. Accordingly, the aligned rotor blade modules 100 and 200 can be screwed together from outside the rotor blade using the tightening tool to screw the threaded rod into the receptacles of the inlay pairs 10 and 20. Further, the assembled rotor blade modules 100 and 200 can be dismounted from outside of the rotor blade using the tightening tool to unscrew the threaded rod from the receptacles of each inlay pair 10 and 20. In doing so, an easy removable and tight but-joined 90 between to rotor blade modules is achieved. This allows a simple assembling of modular rotor blades and exchange of parts thereof. For aerodynamic reasons, the slots 25 between the mounted rotor blade modules are typically covered using e.g. a lid and/or applying an adhesive foil. Further, the slots 25 may be filled with an appropriate filler material prior to closing. Typically, the coverage of the slots 25 has to be removed prior to dismounting two rotor blade modules.

Alternatively and/or in addition the recesses or depressions around the holes (not shown) for the threaded rods 80 of the intermediate piece 50 and 60 may be formed such, that the slots 25 are accessible from inside the modular rotor blade.

Figure 8:
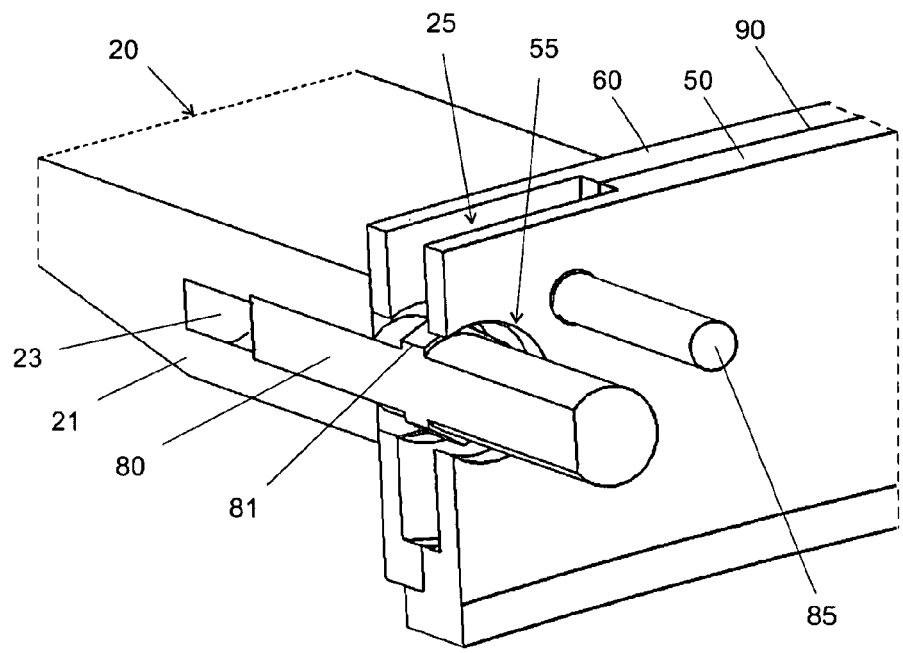
FIG. 8 shows a schematic inset of the assembly shown in FIG. 7 according to further embodiments.

FIG. 8 illustrates the screw-joint used between the inlays 10 and 20 of FIG. 7 in more detail. The shown longitudinal section cuts the threaded rod 80 shown in FIG. 7. According to another embodiment, the rod 80 comprising a male thread on one side, e.g. the left side, and a female thread on the other side, e.g. the right side (threads are not shown). In this example, the bushing 23 of the receptacle 21 includes a female thread (also not shown) into which the threaded rod 80 can be screwed in up to a bedstop. The not shown face-to-face arranged inlay 10 includes a receptacle 11 with a bushing 13 having a male thread into which the threaded rod 80 can be screwed up to a bedstop at the same time. Typically, the bedstops are arranged such that the threaded rod 80 reaches both bedstops if a tight connection between the inlays is established. Further, the threaded rod 80 includes a tool engagement portion 81 fitting e.g. into a fixed spanner. Consequently, the fixed spanner can be used to screw the inlays 10 and 20 together after inserting the threaded rod 80 into both bushings 13 and 23. In addition, the fixed spanner can also be used to unscrew the inlays 10 and 20 from outside the modular rotor blade.

Figure 9:
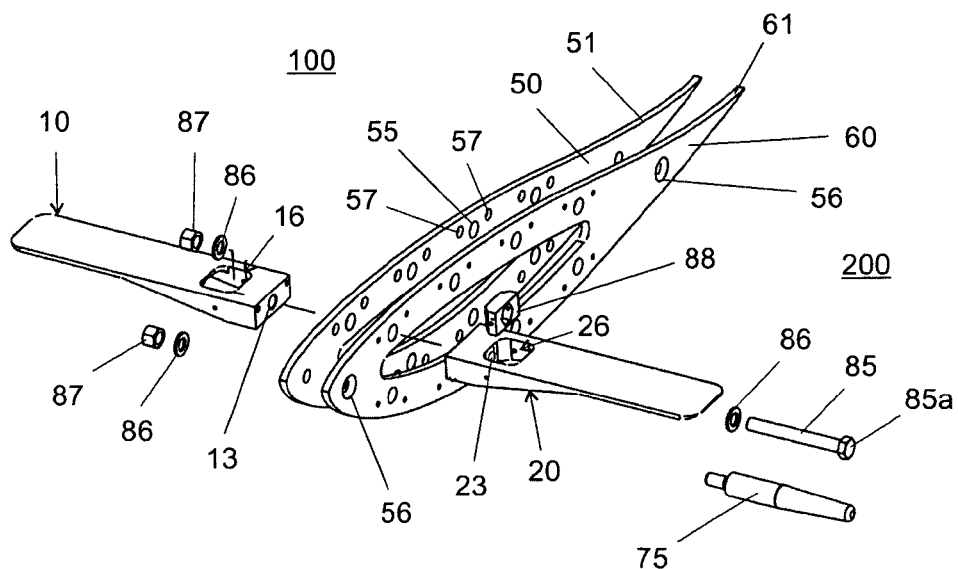
FIG. 9 shows an exploded view of two rotor blade modules according to still another embodiment.

FIG. 9 illustrates another detachable but-joined 90 between two rotor blade modules 100 and 200 according to several embodiments. Again, each rotor blade module is a transversally divided hollow profile member of a modular rotor blade and includes eight inlays which are screwed together in pairs to assemble the rotor blade. For sake of clarity, only one face-to-face arranged inlay pair 10 and 20, and the flat metal intermediate pieces 50 and 60 screwed to the respective inlays 10 and 20 are shown. The fiber composite bodies of the rotor blade modules 100 and 200 are not drawn. The intermediate pieces 50 and 60 include holes 55 for the threaded fasteners 85 and typically smaller holes 57 for the screws used to fasten the intermediate pieces 50 and 60 to the inlays 10 and 20, respectively. The metal inlays 10 and 20 are equally shaped and their receptacle portion includes a non-threaded bushing 13 and 23, respectively.

According to an embodiment, the inlays 10 and 20 further include respective recesses 16 and 26 for accessing the threaded fastener 85 in a direction normal to the inner surface and/or outer surface of the modular rotor blade. The inner and outer surface of the modular rotor blades are also not shown in FIG. 9. Typically, they essentially follow, close to the inlays of the illustrated butt-joint region, the outer profiles 51 and 61 of the intermediate pieces 50 and 60, respectively.

According to still another embodiment, the screw joint between the inlays 10 and 20 is formed by a bolt 85 having a head 85a which fits into an optional insert 88 that can be introduced into the inlay 20. Typically, grommets 86 are additionally used for the screw joint as indicated in the drawing. If the insert 88 is used, only one fixed spanner has typically to be inserted into the recess 16 from outside of the outer rotor blade surface, and used to screw the inlays 10 and 20 together. Likewise, only one fixed spanner has typically to be inserted into the recess 16 and used to unscrew the inlays 10 and 20, if e.g. a rotor blade module is to be replaced. Without the insert 88, two fastening tools are typically used to screw and unscrew the inlays 10 and 20.

Similar as explained with reference to the slots 25 shown in FIG. 7, the recesses 16 and 26 are typically filled and/or sealed by fastening a lid and/or applying an adhesive foil.

Furthermore, the intermediate piece 50 of the rotor blade module 100 includes also two conical metal pre-centering pins 75 (only one is shown) which fit through holes 56 in the intermediate piece 60 and into conical recesses of the fiber composite body of the rotor blade module 200. This simplifies the alignment of the two rotor blade modules which is required during the assembly.

Figure 10:
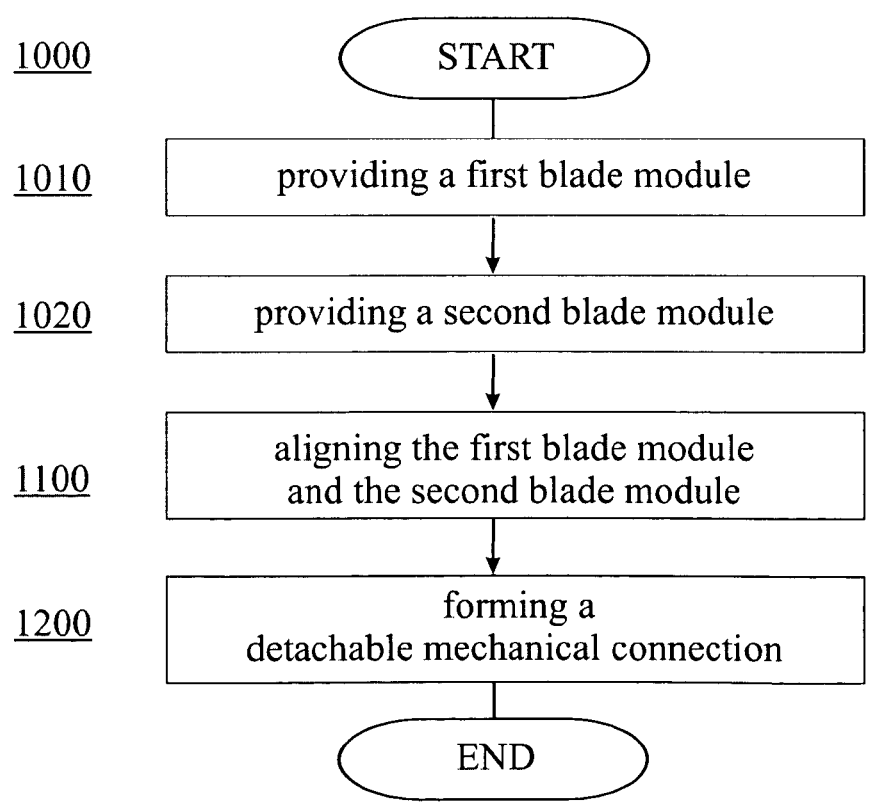
FIG. 10 shows a flow diagram of a method for assembling a modular rotor blade according to an embodiment.

This is explained in more detail with respect to FIG. 10 illustrating a method 1000 for assembling a modular wind turbine rotor blade. A first blade module 100 and a second blade module 200 are provided in the first two steps 1010 and 1020 of the method 1000. Typically, the blade modules are longitudinally divided hollow profile members of the modular rotor blade 5. The first blade module 100 includes a first fiber composite body 150 with a first edge 101 and at least one first inlay 10 extending to the first edge 101. The first inlay 10 includes a first receptacle 11 which is adapted to receive a threaded fastener 80, and an anchoring portion 12 anchored to the first fiber composite body 150. The second blade module 150 includes a second fiber composite body 250 having a second edge 202 and at least one second inlay 20 extending to the second edge 202. The second inlay 20 includes a second receptacle 21 which is adapted to receive the threaded fastener 80, and an anchoring portion 22 anchored to the second fiber composite body 250. Typically, the inlays 10 and 20 a re molded or laminated or glued to the respective fiber composite body. In certain embodiments, the receptacles 11 and 21 are identical.

In a subsequent step 1100, the first blade module 100 and the second blade module 200 are aligned such that the first receptacle 11 and the second receptacle 21 are co-axial. Typically, the receptacles 11 and 22 are aligned such that they are essentially parallel orientated to the longitudinal blade axis.

According to an embodiment, the step 1100 is followed by a step 1200 of forming a detachable mechanical connection between the first inlay 10 and the second inlay 20 by using a one-piece threaded fastener 80 that extends into the first receptacle 11 and into the second receptacle 21. In doing so, a detachable but joined between the blade modules 100 and 200 can be formed.

In certain embodiments, the method 1000 further includes prior to step 1100 a step of fastening a first intermediate piece 50 with holes for the threaded fastener 80 to the first edge 101, and/or a step of fastening a second intermediate piece 60 with holes for the threaded fastener 80 to the second edge 202.

Figure 11:
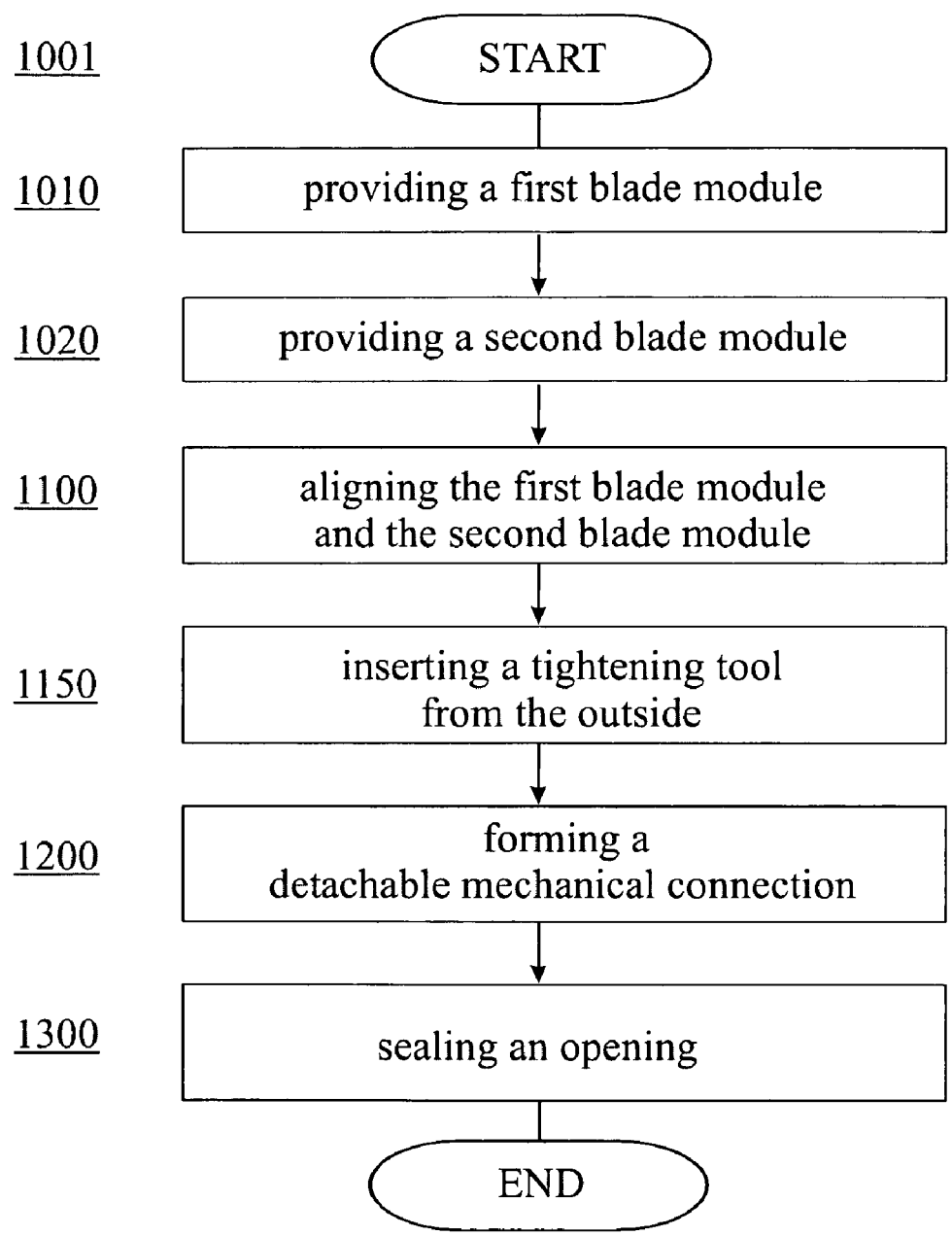
FIG. 11 shows a flow diagram of another method for assembling a modular rotor blade according to further embodiments.

The method 1001 for assembling a modular rotor blade 5 illustrated in FIG. 11 is similar to the method 1000. In addition, a step 1150 of inserting a tightening tool such as a fixed spanner from outside of the modular rotor blade into slots 25 or recesses 16. The tightening tool is used to pair-wise screw the inlays 10 and 20 together. Further, a step 1300 of sealing the opening, e.g. the slots 25 or recesses 16 and/or recesses 26, is applied after step 1200. Sealing the openings typically includes at least one of filling the openings, fastening a lid to the openings, and applying an adhesive foil to form an aerodynamic airfoil.

For disassembling the modular rotor blade, the formed detachable butt-joints 90 are typically unscrewed from outside the rotor blade after removing the sealing of the slots 15 or recesses 16 and/or recesses 26 using the same tightening tool as used for assembling the modular rotor blade.

This written description uses examples to disclose embodiments, including the best mode, and also to enable any person skilled in the art to make and use such embodiments. While various specific embodiments have been described, those skilled in the art will recognize other embodiments can be practiced with modification within the spirit and scope of the claims. Especially, mutually non-exclusive features of the embodiments described above may be combined with each other. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blade module of a modular rotor blade, the blade module comprising a fiber composite body defining a hollow blade profile extending along a longitudinal blade axis and at least one inlay located at or near a longitudinal end of the fiber composite body and comprising a receptacle and an anchoring portion to transmit tensile forces from the receptacle to the fiber composite body, the anchoring portion being anchored to the fiber composite body, and the receptacle being adapted to receive a threaded fastener.

2. The blade module according to claim 1, wherein the fiber composite body comprises an inner surface and wherein the receptacle is arranged on an inner surface of the fiber composite body.

3. The blade module according to claim 1, wherein the receptacle is a flange portion of the inlay adapted to receive a threaded fastener which is orientated essentially parallel to the longitudinal blade axis.

4. The blade module according to claim 1, wherein the fiber composite body comprises an outer surface and wherein the inlay further comprises a recess allowing to access the threaded fastener in a direction normal to the outer surface.

5. The blade module according to claim 1, wherein the fiber composite body further comprises an outer surface, an inner surface and a first lateral surface essentially perpendicularly adjoining the inner surface and the outer surface, and wherein the blade module further comprises an essentially flat intermediate piece fastened to the first lateral surface, the intermediate piece further comprising at least one hole adapted for passing the threaded fastener.

6. The blade module according to claim 5, wherein the intermediate piece further comprises at least one conical pre-centering pin.

7. The blade module according to claim 5, wherein the intermediate piece is fastened to the first lateral surface by at least one of a glued joint and a screw joint.

8. The blade module according to claim 5, wherein the intermediate piece further comprises a depression around the hole on the side opposite to the first lateral surface, the depression extending to at least one of the outer surface and the inner surface.

9. The blade module according to claim 1, wherein the inlay is L-shaped.

10. The blade module according to claim 1, wherein at least one of the receptacle and the anchoring portion is made of a material selected from a group consisting of a metal and a fiber composite material.

11. The blade module according to claim 1, wherein the anchoring portion and the fiber composite body are made of the same material.

12. The blade module according to claim 1, wherein the anchoring portion comprises a surface-enlarging structure.

13. A modular wind turbine rotor blade comprising:
at least a first blade module comprising a first fiber composite body comprising a first edge and at least a first inlay extending to or near to the first edge, the first inlay comprising a first receptacle and an anchoring portion anchored to the first fiber composite body;
at least a second blade module comprising a second fiber composite body comprising a second edge and at least a second inlay extending to or near to the second edge, the second inlay comprising a second receptacle and an anchoring portion anchored to the second fiber composite body, the second receptacle being co-axially orientated to the first receptacle;
a detachable butt joint between the first blade module and the second blade module; and
a screw joint between the first inlay and the second inlay comprising a threaded fastener fastened to the first receptacle and the second receptacle.

14. The modular wind turbine rotor blade according to claim 13, wherein the first blade module and the second blade module are transversally divided hollow profile members of the modular rotor blade.

15. The modular wind turbine rotor blade according to claim 13, wherein the first receptacle comprises a female thread, wherein the second receptacle comprises a male thread and wherein the screw joint comprises a rod comprising a male thread on one side and an a female thread on the other side.

16. The modular wind turbine rotor blade according to claim 13, wherein each of the first receptacle and the second receptacle comprises a bushing, wherein the screw joint comprises at least one nut and wherein the threaded fastener is selected from a group consisting of a bolt comprising a head and a threaded rod.

17. The modular wind turbine rotor blade according to claim 13, wherein at least one of the first blade module and the second blade module further comprises an intermediate piece fastened to the respective edge, the intermediate piece comprising at least one hole adapted for passing the threaded fastener.

18. The modular wind turbine rotor blade according to claim 13, further comprising an outer surface comprising a covered slot allowing to access the screw joint from the outer surface.

19. The modular wind turbine rotor blade according to claim 13, wherein the second blade module is a tip part of the modular wind turbine rotor blade.

* * * * *